United States Patent [19]
Maruyama et al.

[11] 3,907,732
[45] Sept. 23, 1975

[54] PAINT COMPOSITIONS FOR INDICATING IRRADIATION DOSE

[75] Inventors: Tsutomu Maruyama; Koichiro Murata, both of Hiratsuka, Japan

[73] Assignee: Kansai Paint Co., Ltd., Amagasaki, Japan

[22] Filed: Feb. 16, 1971

[21] Appl. No.: 115,814

[30] Foreign Application Priority Data
Feb. 18, 1970 Japan................................ 45-13423
Feb. 19, 1970 Japan................................ 45-13789

[52] U.S. Cl. ..... 260/22 XA; 117/155 R; 117/161 K; 250/83 CD; 252/408; 260/22 CB; 260/40 R
[51] Int. Cl. ........................... C09d 3/64; C09d 5/32
[58] Field of Search ................ 252/408; 250/83 CD; 260/22 XA, 40 R

[56] References Cited
UNITED STATES PATENTS
| | | | |
|---|---|---|---|
| 2,873,210 | 2/1959 | Barrett et al. | 260/22 |
| 2,979,472 | 4/1961 | Heinrich et al. | 260/22 |
| 3,290,499 | 12/1966 | Vale et al. | 250/83 |
| 3,390,121 | 6/1968 | Burford et al. | 260/40 |
| 3,471,422 | 10/1969 | Edlein et al. | 260/22 |
| 3,488,305 | 1/1970 | Siconolfi et al. | 260/22 |
| 3,527,722 | 9/1970 | Carlson et al. | 260/22 |
| 3,536,916 | 10/1970 | Boehm | 250/83 |

Primary Examiner—Ronald W. Griffin
Attorney, Agent, or Firm—J. Gibson Semmes

[57] ABSTRACT

Paint compositions for indicating irradiation dose are prepared from chlorine-combined polyester, 5 to 30 percent by weight of a reductive discoloring substance or a mixture of said substances, and/or 0.005 to 2.0 percent by weight of a reducing dyestuff or a mixture of said dyestuffs, in which said chlorine-combined polyester is obtained by a chlorinated dibasic acid or its anhydride as an acid component or a part of an acid component selected from a group consisting of 3-chlorophthalic acid, 4-chlorophthalic acid, dichlorinated phthalic acid, tetrachlorophthalic acid, 1,-4,5,6,7,7-hexachlorobicyclo-(2,2,1)-5-heptene-2,3-dicarboxylic acid, 4-chloro-4-cyclohexene-1,2-dicarboxylic acid and the anhydrides corresponding to said acids.

8 Claims, No Drawings

PAINT COMPOSITIONS FOR INDICATING IRRADIATION DOSE

BACKGROUND OF THE INVENTION

This invention relates to paint compositions for indicating irradiation dose and particularly to the paint compositions suitable for measuring irradiation dose of ionizing radiation.

Ionizing radiation by proton beam, $\alpha$-ray, $\beta$-ray, $\gamma$-ray, electron-beam, X-ray and the like is utilized recently for various industrial fields such as sterilization or asepticization of medical supplies or medical instruments by the irradiation thereof, sterilization or preservation of perishable foods by the irradiation thereof, modification of the properties of plastics by cross linking or decomposition treatment of plastics by irradiating thereof, and curing of plastic film by the irradiation thereof. In these cases, a paint composition for indicating radiation dose has been known as a means by which radiation dose can be easily and simply indicated or measured. That is, heretofore, resin compositions for indicating irradiation dose comprising chlorine-contained polymer such as vinyl chloridevinyl acetate copolymer, vinyl chloride polymer and vinylidene chloride polymer, acid sensitive dyestuff, and accelerator for decomposing and deteriorating said polymer have been commonly known. However, a coated film obtained from such a resin composition as mentioned above results in deterioration of the properties thereof such as decrease of weathering resistance and solvent resistance, and lowering of adhesiveness by the irradiation of coated film. As a result, the coated film as mentioned above is useless in the case when desirable properties to be possessed for the coated film of a paint are required after the irradiation thereof.

SUMMARY OF THE INVENTION

It is an object of the present invention to overcome the above-mentioned disadvantages and thereby to produce novel paint compositions for indicating irradiation dose in an advantageous manner.

According to the present invention, therefore, there are provided paint compositions for indicating irradiation dose which still have properties as its coated film after the irradiation, although which can be continuously discolored by irradiation to indicate its irradiation dose.

It is another object of this invention to provide novel paint compositions for indicating irradiation dose for which addition of no decomposing and deteriorating accelerator is required.

It is a further object of this invention to provide novel paint compositions for indicating irradiation dose which have a favorable color stability, an excellent solvent resistance and a favorable adhesion with respect to a material to be coated after the irradiation thereof.

The detailes and utility of the invention will be more clearly apparent from the following detailed description beginning with general considerations and concluding with specific examples of practice constituting preferred embodiments of the invention and other examples for comparison and reference.

DETAILED DESCRIPTION

The present invention relates more specifically to paint compositions for indicating irradiation dose comprising (A) a chlorine-combined polyester resin obtained by a chlorinated dibasic acid or its anhydride as an acid component or a part of an acid component selected from a group consisting of 3-chlorophthalic acid, 4-chlorophthalic acid, dichlorinated phthalic acid, tetra chlorophthalic acid, 1,4,5,6,7,7-hexachlorobicyclo-(2,2,1)-5-heptene-2,3-dicarboxylic acid, 4-chloro-4-cyclohexene-1,2-dicarboxylic acid and the anhydrides corresponding to said acids, (B) 5 to 30 percent by weight of a reductive discoloring substance or a mixture of said substances, and/or (C) 0.005 to 2.0 percent by weight of a reducing dyestuff or a mixture of said dyestuffs.

These acids and their acid anhydrides mentioned above may be separately or incorporately used for producing a chlorine-combined polyester resin.

The polyester resins containing the above mentioned acids or their acid anhydrides as an acid component or a part of an acid component are prepared by condensating the mixture comprising 1.0 mol of carboxylic group of acid and 1.0 to 1.2 mol of hydroxyl group of glycol. The condensation-reaction is carried out by usual condensation-reaction. In the case of using the abovementioned acids or their acid anhydrides as a part of an acid component, it must be containing more than 25 percent by mol of the abovementioned acids or their acid anhydrides in the acid component.

Glycols which may be used in the invention include primary or secondary alcoholic glycols, for example, 1,2-glycols, such as ethylene glycol, propylene glycol, 1,2-butanediol, 1,2-pentanediol, 2,3-pentanediol, threo-2,3-pentanediol, erythro-2,3-pentanediol and 3-methyl-1,2-butanediol; 1,3-glycols, such as trimethylene glycol, $\beta$-butylene glycol, 2,4-pentanediol, 2,2-dimethyltrimethylene glycol, 2,2-dimethyl-1,3-butanediol and 2,2-dimethyl-1, 3-pentanediol; 1,4-glycols, such as tetramethylene glycol, 1,4-pentanediol, 3-methyl-2,5-pentanediol, 1,4-hexanediol and 2,5-hexanediol; and 1,5-glycols or 1,6-glycols, such as pentamethylene glycol, 1,5-hexanediol and hexamethylene glycol.

Polybasic acids as a part of an acid component which may be used, include, for example, aromatic carboxylic acids, such as phthalic acid, isophthalic acid, terephthalic acid and trimellitic acid and anhydrides thereof; aliphatic dibasic carboxylic acids, for example, succinic acid, maleic acid, adipic acid, azeraic acid and sebacic acid and acid anhydrides thereof; and mixtures of any thereof.

Monobasic acids which may be used, include, for example, coconut oil, cotton seed oil, soyabean oil, rice oil, safflower oil and their fatty acids or mixture thereof. Moreover monobasic acids which may be used, include, also for example, from $C_8$ to $C_{18}$ aliphatic monobasic acids and mixture thereof such as caprylic acid, pelargonic acid, capric acid, undecylic acid, lauric acid, tridecylic acid, myristic acid, pentadecylic acid, palmitic acid, heptadecylic acid, stearic acid, lauroleic acid, myristoleic acid, palmitoleic acid, oleic acid, ricinoleic acid, linoleic acid, linolenic acid, eleostrearic acid, and licanic acid.

Polyester resins modified with these monobasic acids have less than 15 percent by weight of monobasic acid content.

It is necessary that each acid value of the resins and resin compositions mentioned above is less than 40. In the case when the acid value is higher than 40, since the paint compositions are not clearly discolored, it is unfavorable for practical use.

Furthermore, the content of these acids is more than 25 percent by mole of the acid component in a resin composed by these acids or a mixture system. In the case when the content of these acids is less than 25 percent by mol discoloring effect of the paint compositions by irradiation is small so that the confirmation of discoloring by irradiation becomes also difficult.

For the reductive discoloring substance adding for discoloring pair or the coated film thereof by irradiation in the present invention, there are organic metallic salts discolored by oxidation or reduction reaction such as cobalt naphthenate, cobalt octenate, and iron naphthenate.

Furthermore, for the reducing dyestuffs, those discolored by oxidation or reduction reaction such as benzeneazonaphthylamine, p-aminoazobenzen (Aniline Yellow), p-dimethylaminoazobenzene, p-diethylaminoazobenzene, sodium sulfonate of mixture of aminodionilino, trianilino-, and tetraanilinophenylphenazinium chloride (Color Index No. 50,405, for example Induline) and sodiumindigo disulfonate (Indigo Carmine) are employed in this invention.

The reductive discoloring substances and reducing dyestuffs mentioned above may be used separately from or incorporately with each other in this invention. An amount added of the reductive discoloring substance is within a range of from 5 to 30 percent, preferably from 10 to 25 percent by weight with respect to the above-mentioned resin. The reducing dyestuff is added to said resin in a range of from 0.005 to 2.0 percent, preferably from 0.01 to 1.0 percent by weight. The order for compounding or mixing of the resin and the reductive discoloring substance or reducing dyestuff is not particularly limited, but it is merely necessary that they are uniformly admixed with each other.

With the paint composition for indicating irradiation dose according to this invention, pigments, fillers, plasticizers, or additives employed in the other common paint compositions may be usually used in a dispersed or mixed manner. In the paint compositions for indicating irradiation dose of this invention, any organic solvent generally used for a common paint composition may be employed and a solvent having a particularly high dissolving power is not required as in conventional paint compositions for indicating irradiation dose. Accordingly, the paint composition of this invention can be easily applied with a comparatively thick film on a material to be applied. Furthermore, in the paint compositions of the present invention, ethylenically unsaturated vinyl monomers may be used as solvents.

Ethylenically unsaturated vinyl monomers which may be used, include, for example, styrene and its derivatives represented by the following general formula of

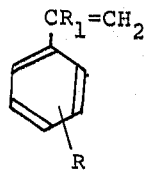

(wherein $R_1$ is hydrogen or methyl.), acrylates or methacrylates represented by the following general formula of

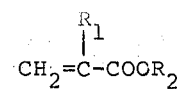

(wherein $R_1$ is the same mentioned above, and $R_2$ is alkyl group having $C_1$ to $C_{12}$), vinyl acetate and divinyl benzene. These ethylenically unsaturated vinyl monomers may be used separately from or incorporately with each other in this invention. An amount used of said vinyl monomers is within the range of 10 to 50 percent by weight of total amount of polyester resins and the vinyl monomers used in this invention.

After coating thus obtained paint compositions indicating for irradiation dose on a material to be coated, when ionizing radiation is applied, the coated paint is continuously discolored in accordance with its irradiation dose and the discoloration can be easily discriminated by the naked eye.

The paint compositions of this invention are applied on a paper, plastic sheet, metallic panel, textile, glass, or wood and is dried at a room temperature or in a heating condition. When thus applied materials are employed by causing to bond it to a material to be irradiated, the applied paint film is discolored in response to the variation of irradiation dose. The color after discoloring by irradiation differs in accordance with the dose or irradiation and the kinds of employed reductive discoloring substances or reducing dyestuffs. Accordingly, the irradiation dose in a low region can be easily and suitably measured by preliminary obtaining a relationship between the irradiation dose and hue of the paint composition.

The range of irradiation dose in which the discoloration of the paint compositions of this invention can be discriminated by the naked eye is within that of the irradiation dose required for industrial modification or curing of plastics, and sterilization of perishable foods, that is, from 0.01 to 50 M rad, (or Mr); preferably from 0.5 to 15 M rad.

The ionizing radiations adopted in the present invention are proton beam, $\alpha$-ray, $\beta$-ray, $\gamma$-ray, accelerated electron beam, and X-ray and particularly accelerated electron beam, $\beta$-ray, and $\gamma$-ray are desirable. For these radiation sources, there are, for example, various electron accelerators, strontium 90, cobalt 60, and cesium 137.

The principle of the discoloration of the paint compositions of this invention is conjectured in such that when ionizing radiation is applied on the paint compositions, dechlorination occurs in a portion of chlorinated acids which are in ester linkage in a polymer, and the resulting hydrogen chloride acts on the reductive discoloring substance and/or reducing dyestuffs contained in the paint compositions thereby to continuously and clearly discolor its coated film of the paint compostions. Furthermore, the fact that the coated film of the paint composition still remains properties as a coated film after the application of ionizing radiation is conjectured from a reason to the effect that even when dechlorination occurs in the chlorinated acids, decomposition does not yet occur in its resin structure, but the unsaturated acids carries out cross linking reaction, particularly when an ethylenically unsaturated vinyl monomer is employed as a solvent, the cross linking reaction occurs instantly, whereby the properties of the coated film of the paint compositions are not lost.

Since the resins employed for this invention have comparatively large chlorine content per acid mole, discoloring effect is remarkable and accordingly, the discoloring substance is sufficient a small ratio to discolor the coating film of this invention.

As a result of many years of our study the improved resin was obtained in the present invention. In the resin according to this invention, there is not particularly required for employing a decomposing accelerator, whereas it is employed for decomposing resin in the case of conventional resins. Furthermore, the coated film properties and physical properties of the resin of this invention can be suitably changed for a wide range as compared with conventional resins and therefore, the resin of the present invention can be very widely used as a resin for paint.

In conventional resins, for example, vinyl chloride resin and vinylidene chloride resin deteriorate remarkably with respect to irradiation and these resins belong to a decomposing type resin, respectively, while polyester resin is a cross linking type with respect to irradiation. Moreover, vinyl chloride resin has such a disadvantage as the hydrochloric acid produces from the resin being accompanied with the decomposition by irradiation, and the hydrochloric acid said produced accelerates the decomposition of the resin, and as a result, the stability of discolored film after irradiation is inferior.

The coating film according to this invention has a favorable color stability after irradiation, since the polyester resins according to this invention are the cross linking type for radiation, the resins are stable against irradiation and furthermore the cross linkages are advanced without the decomposition. As a result, the coating film after irradiation have excellent properties such as weather resistance, solvent resistance and adhesion.

Accordingly, the paint compositions of this invention are not only used for indicating irradiation dose, but also it is possible to obtain the coating film having the properties of ordinary coating film even after the irradiation thereof.

In order to indicate still more clearly the nature and utility of the invention, the following specific examples of practice constituting preferred embodiments of the invention and results are set forth it being understood that these examples are presented as illustrative only.

In the examples, all of the parts and percentages are indicated by weight, respectively.

EXAMPLE 1

Into a reactor provided with a stirrer, a pipe for introducing inert gas, and a water separator, 5 mol of 1,4,5,6,7,7-hexachlorobicyclo-(2,2,1)-5-heptene-2,3-dicarboxylic acid, 5 mol of maleic anhydride, and 10.5 mol of ethylene glycol were placed. A temperature of the content in the reactor was gradually elevated to 200°C while causing nitrogen gas to pass through the content and stirring it, and the content was made to react with each other at this temperature for 1 hr. then, 5 percent of toluene was added to the content as a reflux solvent for azeotropy, the reaction was further continued at a temperature of 200°C for 2.5 hrs, and then, the reaction was completed. The acid value of a resin at the time of completing the reaction was 17.3. Thereafter, a temperature of the content in the reactor was lowered to 180°C, toluene was distilled off from the content by reduced pressure distillation, further, a temperature of the content was lowered to 110°C, and styrene containing 600 ppm of hydroquinone was added to the resulting resin in such a manner that the resin content of which being 70 percent, whereby a styrene solution of unsaturated polyester was obtained.

To 100 parts of thus obtained styrene solution of unsaturated polyester, 50 parts of 60 percent toluene solution of cobalt naphthenate, and 20 parts of methyl methacrylate were added and was sufficiently stirred to obtain a paint composition.

The paint composition thus obtained was applied on an art paper of 180 kg-grade with a bar coater in such a manner that a thickness of the applied film being 30 microns. Thus applied paint composition was subjected to irradiation by 2 and 4 M rad, respectively, with a transformer type electron accelerator in such a condition that an electron beam energy being 300 KeV and an electron beam current 25 mA, respectively, and hue, value and chroma of the applied film of the paint composition before and after irradiation were compared, respectively, by means of Munsell Book (In accordance with ASTM D1535-58T. This is to be repeated in the following.), the values were 5R 8/4, 2.5Y 7/4, and 5Y 5/5, respectively.

EXAMPLE 2

To 100 parts of the styrene solution of unsaturated polyester in Example 1, 0.05 part of paradimethylaminoazobenzene was added and blended to cause it sufficiently dissolve thereinto, to obtain a paint composition. The paint composition thus obtained was applied on an art paper of 180 kg-grade with a bar coater in such a manner that a thickness of the applied film being 25 microns and was dried. Then, thus applied paint composition was subjected to irradiation with cobalt 60 of 90,000 curie in the dose rate of $1 \times 10^6$ r/hr and the following results were obtained.

| Dose of Irradiation | Naught | 2 Mrad | 4 Mrad |
|---|---|---|---|
| Color Change in Accordance with Munsell Book | 7.5 YR 7/10 | 7.5 R 6/12 | 7.5 RP 4/12 |
| Alcohol Resistance* | Slightly Swelling | No change | No change |

*Note 1: On the applied film, a glass ring was tightly bonded with paraffin and further, the outer periphery of the ring was sealed. Then, 50% methanol solution was poured into the ring and was left at 20°C for 1 hr. The appearance of the applied film immediately after wiping off the methanol on the film was observed.

EXAMPLE 3

To 100 parts of the styrene solution of unsaturated polyester in Example 1, 0.6 part of Indigo Carmine was added and blended, furthermore, was dispersed with a quick paint mill for 1 hr. Then, 0.04 part of paradimethylaminoazobenzene was added to the resulting mixture and was admixed with each other and dissolved sufficiently to obtain a paint composition.

The paint composition thus obtained was applied on an art paper of 180 kg-grade with a bar coater in such a manner that a thickness of the applied film being 40 microns. Thus applied paint composition was subjected to irradiation by 2 Mr, 4 Mr, and 6 Mr, respectively, with cobalt 60 of 90,000 curie in the dose rate of $1 \times 10^6$ r/hr. As a result of comparing the degrees of color changes of these irradiated smaples and another sample without irradiation in accordance with Munsell Book, they were 10 Y 5/4, 7.5 R 5/2, 10 P 6/8, and 7.5 P 5/8, respectively. Furthermore, as a result of leaving these irradiated samples as they were in a room at a room temperature for 30 days, no discoloration was observed by the naked eye.

EXAMPLE 4

Into a similar reactor as in Example 1, 3 mol of 1,4,5,6,7,7-hexachlorodicyclo-(2,2,1)-5-heptene-2,3-dicarboxylic anhydride, 2 mol of 4-chloro-4-cylcohexene-1,2-dicarboxylic anhydride, 5 mol of phthalic anhydride, 5.5 mol of ethylene glycol, and 5 mol of diethylene glycol were placed and subjected to condensation by a similar operation as in Example 1 till an acid value of the resulting resin being reached to 11.2, and the reaction was completed. The resulting resin was diluted with toluene to prepare 80 percent resin varnish.

To 100 parts of the resin varnish, 0.1 part of paradimethylaminoazobenzene, 0.17 part of Indigo Carmine, and 20 parts of methyl ethyl ketone were blended, respectively, and were disperced with a quick paint mill for 30 min. thereby to obtain a paint composition. Thus obtained paint composition was applied on a surface-treated mild steel panel (70 × 150 × 0.8 mm) with a bar coater in such a manner that a thickness of the applied film being 20 microns and was dried at a room temperature. Then, the dried film was subjected to irradiation with a transformer type electron accelerator in a condition of 300 KV of electron beam energy and 25 mA of electron beam current, and the results of which were compared on the basis of Munsell Book.

EXAMPLE 5

To 120 parts of polyester obtained by condensation, in accordance with an ordinary method, of a mixture consisting of 0.4 mol of 1,4,5,6,7,7-hexachlorobicyclo-(2,2,1)-5-heptene-2,3-dicarboxylic acid, 0.4 mol of fumaric acid, 0.2 mol of tetrahydrophthalic anhydride, 0.7 mol of propylene glycol, and 0.35 mol of diethylene glycol, 40 parts of styrene and 40 parts of methyl methacrylate were added and the polyester was dissolved thereinto thereby to obtain an unsaturated polyester resin composition.

0.06 part of Sudan Yellow GGN (manufactured by Badishe Anilin and Soda Fabrik Co.) and 0.1 part of paraffin (m.p. 46°–48°C) were added to 100 parts of the resin composition and the resulting mixture was sufficiently admixed thereby to obtain a paint composition I.

For the comparison, 20 parts of Saran F-120 (Trade name of polyvinylidene chloride manufactured by Asahi Dow Chemical Co.) was dissolved into a mixed solvent consisting of 40 parts of dioxane and 40 parts of methyl ethyl ketone to prepare a paint composition II.

Three samples, that is, the above paint composition I, the paint composition II, and another paint composition I.P obtained by adding 0.3 part of toluene 60 percent solution of cobalt naphthenate and 0.6 part of diethyl fumarate 50 percent solution of methyl ethyl ketone peroxide to 100 parts of paint composition I were prepared. Each of them was applied on a surface-treated mild sheet panel (70 × 150 × 0.8 mm), being obtained by applying an aminoalkyd white enamel paint thereon so as to have a thickness of 10 microns and baking it at a temperature of 140°C for 20 min., in such a manner that a thickness of the applied film being 20 microns and was left as it was at a temperature of 20°C for 40 hr.

Thus applied test panels were subjected to irradiation with a transformer type electron accelerator in a condition of 300 KV of electron beam energy and 25 mA of electron beam current, respectively, and color changes of these applied films were compared in accordance

| Dose of Irradiation | Naught | 1 Mrad | 2 Mrad | 4 Mrad |
|---|---|---|---|---|
| Color Change in Accordance with Munsell Book | 7.5Y6/7 | 10P6/6 | 2.5RP6/6 | 5RP6/4 | with Munsell Book and further, adhesion, solvent resistances, and accelerated weathering tests of these samples were examined, respectively.

| | Paint | Paint Composition I | | Paint Composition I.P | | Paint Composition II | |
|---|---|---|---|---|---|---|---|
| Test Items | Dose | No Irradiation | 4Mrad | No Irradiation | 4Mrad | No Irradiation | 4Mrad |
| Color Change in Accordance with Munsell Book | | 7.5YR3/8 | 5RP6/8 | 7.5YR8/8 | 5RP6/8 | 10YR7/10 | 7.5R7/10 |
| Adhesiveness (*1) | | No change | No change | No change | No change | No change | Slightly Peeling |
| Solvent Resistance Test (*2) | | Slightly Dissolving | No change | No change | No change | Slightly Swelling | Dissolving Peeling |
| Accelerated Weathering Test (*3), 10 hrs. | | Good | Good | Good | Good | Good | Color became Lighter and Discolored |

*Note 1: 100 squares each having an area of 1×1 mm² were notched to an applied film so as to reach to its substrate, a cellophane tape was stuck closely to the squares, then, the tape was pulled off in a direction of 180 degrees, and cracks and peelings of the applied film were observed.

*Note 2: The same as in Note 1 of Example 2.

*Note 3: In accordance with ASTM D822-60

EXAMPLE 6

In a similar reactor as in Example 1, 0.5 mol of dichlorinated phthalic acid, 0.3 mol of tetrahydrophthalic anhydride, 0.15 mol of adipic acid, 0.1 mol of dehydrated castor oil fatty acid, and 1.1 mol of neopentyl glycol were condensated in accordance with an ordinary method to obtain a polyester having an acid value of 8.5. Thus obtained resin was dissolved into a mixed solvent consisting of 1:1 weight ratio of toluene and methyl ethyl ketone to prepare a resin varnish of 60 percent solution.

To the resin varnish thus obtained, 0.1 part of paradimethylaminoazobenzene, 0.5 part of Indigo Carmine, and 10 parts of toluene were blended and dispersed with a quick paint mill for 30 min. to obtain a paint composition. The resulting paint composition was applied on an art paper of 180 kg-grade with a bar coater in such a manner that a thickness of the applied film being 40 microns and was dried, then, so dried film was irradiated by 2 Mrad and 4 Mrad, respectively, with a transformer type electron acclelerator in a condition of 300 KV of electron beam energy and 25 mA of electron beam current.

Hue, value and chroma of the applied film of the paint composition before and after irradiation were compared, respectively by means of Munsell Book.

| Dose of Irradiation | Naught | 2 Mrad | 4 Mrad |
|---|---|---|---|
| Color Change in Accordance with Munsell Book | 2.5 GY 6/6 | 2.5 RP 5/6 | 7.5 P 6/8 |

EXAMPLE 7

To 100 parts of the resin varnish in Example 6, 18 parts of toluene 60 percent solution of cobalt naphthenate and 10 parts of acetone were added and sufficiently stirred to prepare a paint composition. Thus obtained paint composition was applied on an art paper of 180 kg-grade with a bar coater in such a manner that a thickness of the applied film being 30 microns and was dried. Then, the dried film was irradiated under the same condition as in Example 1 and the following results were obtained.

| Dose of Irradiation | Naught | 2 Mrad | 4 Mrad |
|---|---|---|---|
| Color Change in Accordance with Munsell Book | 7 R 7/4 | 2.5 Y 6/4 | 5 Y 6/4 |

EXAMPLE 8

In a similar reactor as in Example 1, 0.5 mol of tetrachlorophthalic acid, 0.4 mol of maleic anhydride, 0.1 mol of adipic acid, 0.9 mol of neopentyl glycol, and 0.2 mol of diethylene glycol were condensated in accordance with an ordinary method to prepare an unsaturated polyester having an acid value of 18. The resulting unsaturated polyester was dissolved into styrene to obtain an unsaturated polyester resin of 50 percent styrene solution.

To 100 parts of thus obtained resin, 0.08 part of paradimethylaminoazobenzene, 1 part of 60 percent toluene solution of cobalt naphthenate, 0.02 part of paraffin (m.p. 44° – 46°C), and 10 mg of hydroquinone were blended and sufficiently stirred to prepare a paint composition for indicating irradiation dose.

Two kinds of samples, that is, the paint composition without addition of any peroxide and another which was obtained by adding 1 part of diethyl fumarate 60 percent solution of methyl ethyl ketone peroxide to 100 parts of the paint composition were prepared. Each of them was applied on a sheet which was obtained by applying a thermo-setting aminoalkyd resin white enamel on a surface-treated mild steel panel of a thickness of 0.8 mm so as to have a thickness of 13 microns and baking it at a temperature of 140°C for 20 min. in such a manner that a thickness of the applied film being 25 microns. The applied film of the composition without adding any peroxide was irradiated with electron beam immediately after its application and while, the applied film of the composition with adding the peroxide was irradiated with electron ray after leaving as it was at a room temperature for 24 hr. in the same condition as in Example 1, respectively.

For the comparison, 30 parts of Saran F-120 (Trade name of polyvnylidene chloride manufactured by Asahi Dow Chemical Co.) was dissolved into a mixed solution consisting of 40 parts of dioxane and 30 parts of methyl ethyl ketone, and further, 0.05 part of paradimethylaminoazobenzene was added and blended thereto. The resulting mixture constituents were sufficiently dissolved each other and were applied on the panel as in the same condition as mentioned above, then, so applied film was irradiated with electron beam.

The results of color comparison in accordance with Munsell Book, adhesion and solvent resistance tests relating to the samples prepared as mentioned above will be shown in the following table.

| Test Items | Paint Dose | Unsaturated Polyester Paint | | The Same as Left Column, Curing by Peroxide | | Polyvinylindene Chloride Paint | |
|---|---|---|---|---|---|---|---|
| | | No Irradiation | 4Mrad | No Irradiation | 4Mrad | No Irradiation | 4Mrad |
| Comparison with Munsell Book | | 10YR7/10 | 10RP6/10 | 10YR7/10 | 10RP6/10 | 10YR8/12 | 7.5R7/10 |
| Adhesiveness Test (*1) | | No change | No change | No change | No change | No change | Slightly Peeling |
| Solvent Resistance Test (*2) | | Slightly Dissolving | No change | No change | No change | Slightly Swelling | Dissolving and Peeling |

*Note 1: The same as Note 1 of Example 5.
*Note 2: The same as Note 1 of Example 2.

EXAMPLE 9

In a similar reactor in Example 1, 1.0 mol of 3-chlorophthalic anhydride, 0.1 mol of dehydrated castor oil fatty acid, and 1.1 mol of neopentyl glycol were condensated in accordance with an ordinary method to obtain a polyester having an acid value of 13. Thus obtained resin was dissolved into a mixed solvent consisting of 1:1 weight ratio of toluene and methyl ethyl ketone to prepare a resin varnish of 60 percent solution.

To the resin varnish thus obtained, 0.08 part of parademethylaminoazobenzene and 0.4 part of Indigo Carmine, and 10 parts of toluene were dispersed with a quick paint mill for 30 min. to obtain a paint composition. The resulting paint composition was applied on an art paper of 180 kg-grade with bar coater in such a manner that a thickness of the applied film being 30 microns and was dried, then, so dried film was irradiated by 1.7Mrad and 3.5Mrad, respectively, with a transformer type electron accelerator in a condition of 300 KV of electron beam energy and 25mA of electron beam current.

Hue, value and chroma of the applied film of the paint composition before and after irradiation were compared, respectively, by means of Munsell Book.

| Dose of Irradiation | Naught | 1.7Mrad | 3.5Mrad |
|---|---|---|---|
| Color Change in Accordance with Munsell Book | 2.5GY7/8 | 2.5RP6/6 | 10P6/6 |

What is claimed is:

1. Paint compositions for indicating irradiation dose comprising:
   A. a chlorine-combined polyester resin having an acid value of less than 40 obtained by condensing a polybasic acid component comprising more than 25 mol percent of a chlorinated dibasic acid component comprising more than 25 mole percent by dibasic acid or its anhydride selected from the group consisting of 3-chlorophthalic acid, 4-chlorophthalic acid, dichlorinated phthalic acid, tetrachlorophtharic acid, 1,4,5,6,7,7-hexachlorobicyclo-(2,2,1)-5-heptene-2,3-dicarboxylic acid, 4-chloro-4-cyclohexene-1,2-dicarboxylic acid and anhydrides corresponding to said acids with glycols, and
   B. 5 to 30 percent by weight of a reductive discoloring substance and
   C. 0.005 to 2.0 percent by weight of a reducing dyestuff.

2. Paint compositions for indicating irradiation dose according to claim 1, in which said polyester resin is further modified by less than 15 percent by weight of monobasic acid selected from the group consisting of coconut oil, cotton seed oil, soyabean oil, rice oil, safflower oil and their fatty acids, aliphatic monobasic acids having 8 to 18 carbon atoms, and mixture thereof.

3. Paint compositions for indicating irradiation dose according to claim 2, in which said aliphatic monobasic acids are at least one member selected from the group consisting of caprylic acid, pelargonic acid, capric acid, undecylic acid, lauric acid, tridecyclic acid, myristic acid, pentadecylic acid, palmitic acid, heptadecylic acid, stearic acid, lauroleic acid, myristoleic acid, palmitoleic acid, oleic acid, recinoleic acid, linoleic acid, linolenic acid, eleostearic acid and licanic acid.

4. Paint compositions for indicating irradiation dose according to claim 1, in which said polybasic acid component comprises at least one member selected from the group consisting of phthalic acid, isophthalic acid, terephthalic acid, trimellitic acid, succinic acid, maleic acid, adipic acid, azeraic acid, sebacic acid, and acid anhydrides thereof.

5. Paint compositions for indicating irradiation dose according to claim 1, in which said glycols include at least one member selected from the group consisting of ethylene glycol, propylene glycol, 1,2-butanediol, 1,2-pentanediol, 2,3-pentanediol, threo-2,3-pentanediol, erythro-2,3-pentanediol, 3-methyl-1,2-butanediol, trimethylene glycol, β-butylene glycol, 2,4-pentanediol, 2,2-dimethyltrimethylene glycol, 2,2-dimethyl-1,3-butanediol, 2,2-dimethyl-1,3-pentanediol, tetramethylene glycol, 1,4-pentanediol, 3-methyl-2,5-pentanediol, 1,4-hexanediol, 2,5-hexanediol, pentamethylene glycol, 1,5-hexanediol and hexamethylene glycol.

6. Paint compositions for indicating the irradiation dose according to claim 1, in which said chlorine-combined polyester resin is obtained by condensing a mixture comprising 1.0 mol of carboxylic group of acid and 1.0 to 1.2 mol of hydroxyl group of glycol.

7. Paint compositions for indicating irradiation dose according to claim 1, in which said reductive discoloring substance includes at least one member selected from the group consisting of cobalt naphthenate, cobalt octenate and iron naphthenate.

8. Paint compositions for indicating irradiation dose according to claim 1, in which said reducing dyestuff includes one member selected from the group consisting of benzene-azonaphthylamine, paradiethylaminoazobenzene, Aniline Boue, Aniline Yellow and Indigo Carmine.

* * * * *